United States Patent
Corrado et al.

(10) Patent No.: US 10,127,475 B1
(45) Date of Patent: Nov. 13, 2018

(54) CLASSIFYING IMAGES

(71) Applicant: Google LLC, Mountain View, CA (US)

(72) Inventors: Gregory S. Corrado, San Francisco, CA (US); Jeffrey A. Dean, Palo Alto, CA (US); Samy Bengio, Los Altos, CA (US); Andrea L. Frome, Oakland, CA (US); Jonathon Shlens, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/273,572

(22) Filed: Sep. 22, 2016

Related U.S. Application Data (62) Division of application No. 14/144,965, filed on Dec. 31, 2013, now abandoned.

(60) Provisional application No. 61/830,001, filed on May 31, 2013.

(51) Int. Cl.
*G06K 9/62* (2006.01)

(52) U.S. Cl.
CPC ........... *G06K 9/6256* (2013.01); *G06K 9/624* (2013.01); *G06K 9/6227* (2013.01); *G06K 9/6262* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2003/0063780 A1* | 4/2003 | Gutta | ................ | G06K 9/00288 382/118 |
| 2003/0069873 A1 | 4/2003 | Fox et al. | | |
| 2009/0204556 A1* | 8/2009 | Weston | ................ | G06K 9/6276 706/12 |

(Continued)

OTHER PUBLICATIONS

Zhang, Min-Ling, and Zhi-Hua Zhou. "Multilabel neural networks with applications to functional genomics and text categorization." IEEE transactions on Knowledge and Data Engineering 18.10 (2006): 1338-1351. 15 pages.*

(Continued)

*Primary Examiner* — Ryan P Potts
(74) *Attorney, Agent, or Firm* — Fish & Richardson P.C.

(57) ABSTRACT

Methods, systems, and apparatus, including computer programs encoded on computer storage media, for classifying images. One of the methods includes obtaining data that associates each of a plurality of object category labels with a respective high-dimensional representation of the object category label, wherein the high-dimensional representation of the object category label is a numeric representation of the object category label in a high-dimensional space; receiving an input image; processing the input image using one or more core layers to generate an alternative representation of the input image; processing the alternative representation of the input image using a transformation layer to determine a high-dimensional representation for the input image; selecting, from the high-dimensional representations associated with the object category labels, a closest high-dimensional representation to the high-dimensional representation for the input image; and selecting the category label associated with the closest high-dimensional representation as a predicted label for the input image.

17 Claims, 3 Drawing Sheets

(56) References Cited

U.S. PATENT DOCUMENTS

| | | | | |
|---|---|---|---|---|
| 2011/0040711 | A1* | 2/2011 | Perronnin | G06K 9/6232 706/12 |
| 2013/0132315 | A1* | 5/2013 | Principe | G06K 9/6215 706/20 |
| 2014/0019388 | A1* | 1/2014 | Kingsbury | G06N 99/005 706/12 |
| 2014/0029839 | A1* | 1/2014 | Mensink | G06K 9/6272 382/159 |
| 2014/0156575 | A1 | 6/2014 | Sainath et al. | |
| 2014/0219563 | A1* | 8/2014 | Rodriguez-Serrano | G06K 9/18 382/182 |

OTHER PUBLICATIONS

Dean et al., "Large scale distributed deep networks," Conference on Neural Information Processing Systems (NIPS), 2012, 13 pages.

Krizhevsky et al., "Imagenet classification with deep convolutional neural networks," Conference on Neural Information Processing Systems (NIPS), pp. 1106-1114, 2012.

Mikolov et al, "Efficient estimation of word representations in vector space," International Conference on Learning Representations (ICLR), Scottsdale, Arizona, US, 2013, 12 pages.

Bengio et al., "A neural probabilistic language model. Journal of Machine Learning Research," 3:1137-1155, 2003.

Coates and Ng, "The importance of encoding versus training with sparse coding and vector quantization," In International Conference on Machine Learning (ICML), 2011, 8 pages.

Rohrbach et al., "Evaluating knowledge transfer and zero-shot learning in a largescale setting," In CVPR, 1641-1648, 2011.

Socher et al., "Zero-shot learning through cross-modal transfer," In International Conference on Learning Representations (ICLR), Scottsdale, Arizona, USA, 2013, 10 pages.

Labbe et al., "Learning deep neural networks for high dimensional output problems," Machine Learning and Applications, 2009, ICMLA'09, International Conference on. IEEE, 2009. 6 pages.

Jeong et al., "Neural network-based text location for news video indexing," Image Processing, 1999. ICIP 99, Proceedings 1999 International Conference on. vol. 3. IEEE, 1999. 5 pages.

Socher et al., "Parsing natural scenes and natural language with recursive neural networks," Proceedings of the $28^{th}$ International Conference on Machine Learning (ICML-11), 2011. 8 pages.

Han et al., "Centroid-based document classification: Analysis and experimental results," Springer Berlin Heidelberg, 2000, 8 pages.

* cited by examiner

CLASSIFYING IMAGES

CROSS-REFERENCE TO RELATED APPLICATIONS

This application is a divisional of U.S. application Ser. No. 14/144,965, filed on Dec. 31, 2013, which claims priority to U.S. Provisional Application No. 61/830,001, filed on May 31, 2013. The disclosures of the prior applications are considered part of and are incorporated by reference in the disclosure of this application.

BACKGROUND

This specification relates to classifying images using data processing systems.

Visual recognition systems can identify objects in images, i.e., classify input images as including objects from one or more object categories. Some visual recognition systems use one or more neural networks to classify an input image.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, one innovative aspect of the subject matter described in this specification can be embodied in methods that include the actions of obtaining data that associates each term in a vocabulary of terms with a respective high-dimensional representation of the term, wherein the high-dimensional representation of the term is a numeric representation of the term in a high-dimensional space, and wherein the vocabulary of terms comprises a plurality of object category labels; and training a modified visual recognition system on a plurality of training images, wherein each of the plurality of training images is associated with a respective known category label from the plurality of object category labels, wherein the modified visual recognition system is configured to, for each of the training images, receive the training image and to output a high-dimensional representation in the high-dimensional space for the training image, and wherein the training comprises: performing multiple iterations of a training procedure to minimize a loss function, wherein a value of the loss function depends on, for each of the training images, a distance between the high-dimensional representation for the training image and the high-dimensional representation of the known object category label for the training image.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The modified visual recognition system can be configured to, for each of the training images, receive the training image and to select an object category label having a high-dimensional representation that is closest to a high-dimensional representation for the training image as an object category label for the training image, wherein the object category label for the training image is a category label for an object category that the modified visual recognition system determines an object pictured in the input image belongs to, wherein the modified visual recognition system comprises one or more core layers and a transformation layer, wherein the one or more core layers are configured to receive the training image and generate an alternative representation of the training image, and wherein the transformation layer is configured to receive the alternative representation of the training image from the core layers and generate the high-dimensional representation for the training image.

The actions can further include: training an initial visual recognition system on the plurality of training images to determine pre-trained values of parameters of the one or more core layers, wherein the initial visual recognition system is configured to, for each of the training images, receive the training image and predict a respective score for each of a plurality of object categories, wherein the respective score for each of the plurality of object categories represents a predicted likelihood that the training image contains an image of an object from the object category, wherein the initial visual recognition system comprises the one or more core layers and a classifier layer, and wherein the classifier layer is configured to receive the alternative representation of the training image and generate the respective scores for the training image.

Training the modified visual recognition system can include generating trained values of parameters of the core layers and of parameters of the transformation layer from the pre-trained values of the parameters of the core layers and initial values of the parameters of the transformation layer.

Selecting an object category label having a high-dimensional representation that is closest to a high-dimensional representation for the training image can include selecting an object category label that is associated with a high-dimensional representation that has a largest cosine similarity value with the high-dimensional representation for the predicted category label for the training image.

The loss function for each of the plurality of training images can satisfy:

$$\text{loss(image, label)} = \sum_{j \neq label} \max[0, \text{margin} - \vec{t}_{label} M \vec{v}(\text{image}) + \vec{t}_j M \vec{v}(\text{image})],$$

wherein label is a known category label for the training image, $\vec{v}(\text{image})$ is an output of a last layer of the core layers for the training image, M is a matrix of parameter values of the transformation layer, $\vec{t}_{label}$ is a representation of the known label for the training image in the high-dimensional space, $\vec{t}_j$ is a high-dimensional representation of an object category j in the pre-determined vocabulary of terms, and margin is a constant value. The t vectors and the embedding vectors learned by the language model are unit normed. With unit norming, the cosine similarity and dot-product similarity measures are equivalent.

Training the modified visual recognition system can include training the modified visual recognition system to produce, for each of the training images, a higher cosine similarity between the predicted high-dimensional representation for the training image and the high-dimensional representation of a label for a corresponding known object category for the training image than between the predicted high-dimensional representation for the training image and representations of other terms in the vocabulary.

Obtaining the data that associates each term in a vocabulary of terms with a respective high-dimensional representation of the term can include: training a machine learning system configured to process each term in the vocabulary of terms to obtain the respective high-dimensional representation of the term in the vocabulary and to associate each term in the vocabulary with the respective high-dimensional representation of the term.

In general, another innovative aspect of the subject matter described in this specification can be embodied in methods that include the actions of obtaining data that associates each of a plurality of object category labels with a respective high-dimensional representation of the object category label, wherein the high-dimensional representation of the object category label is a numeric representation of the object category label in a high-dimensional space; receiving an input image; processing the input image using one or more core layers to generate an alternative representation of the input image; processing the alternative representation of the input image using a transformation layer to determine a high-dimensional representation for the input image; selecting, from the high-dimensional representations associated with the object category labels, a closest high-dimensional representation to the high-dimensional representation for the input image; and selecting the category label associated with the closest high-dimensional representation as a predicted label for the input image.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Selecting the closest high-dimensional representation to the high-dimensional representation for the input image can include selecting a high-dimensional representation having a largest cosine similarity value with the high-dimensional representation for the input image. Obtaining data that associates each of a plurality of object category labels with a respective high-dimensional representation of the object category label can include: training a machine learning system configured to process each term in a vocabulary of terms to obtain the respective high-dimensional representation of the term in the vocabulary and to associate each term in the vocabulary with the respective high-dimensional representation of the term, wherein the vocabulary of terms comprises the plurality of object category labels. The high-dimensional representations can be vectors of floating point values. The high-dimensional space can have a dimensionality of at least one thousand.

Particular embodiments of the subject matter described in this specification can be implemented so as to realize one or more of the following advantages. By training a visual recognition system to predict representations of labels in a high-dimensional space, category labels for images can be accurately predicted. Additionally, the accuracy of zero-shot predictions, i.e., predictions of labels that were not observed during training, can be improved. Further, labels that are inaccurately predicted by the visual recognition system may be semantically or syntactically related to the correct label for the input image. Additionally, the visual recognition system may be able to easily predict labels that are specific, generic, or both for a given input image.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a visual recognition system that receives an input image and generates a category label for the input image. The category label is a label for an object category that the system determines an object pictured in the input image belongs to. In order to generate the label, the visual recognition system generates a high-dimensional representation, i.e., a numeric representation in a high-dimensional space, for the input image and uses the representation to select a category label for the input image.

The visual recognition system includes one or more core layers and a transformation layer, each having a respective set of parameters. The values of the parameters can be determined by training the system on a set of training images, e.g., by pre-training the one or more core layers and then training the transformation layer.

Figure 1:
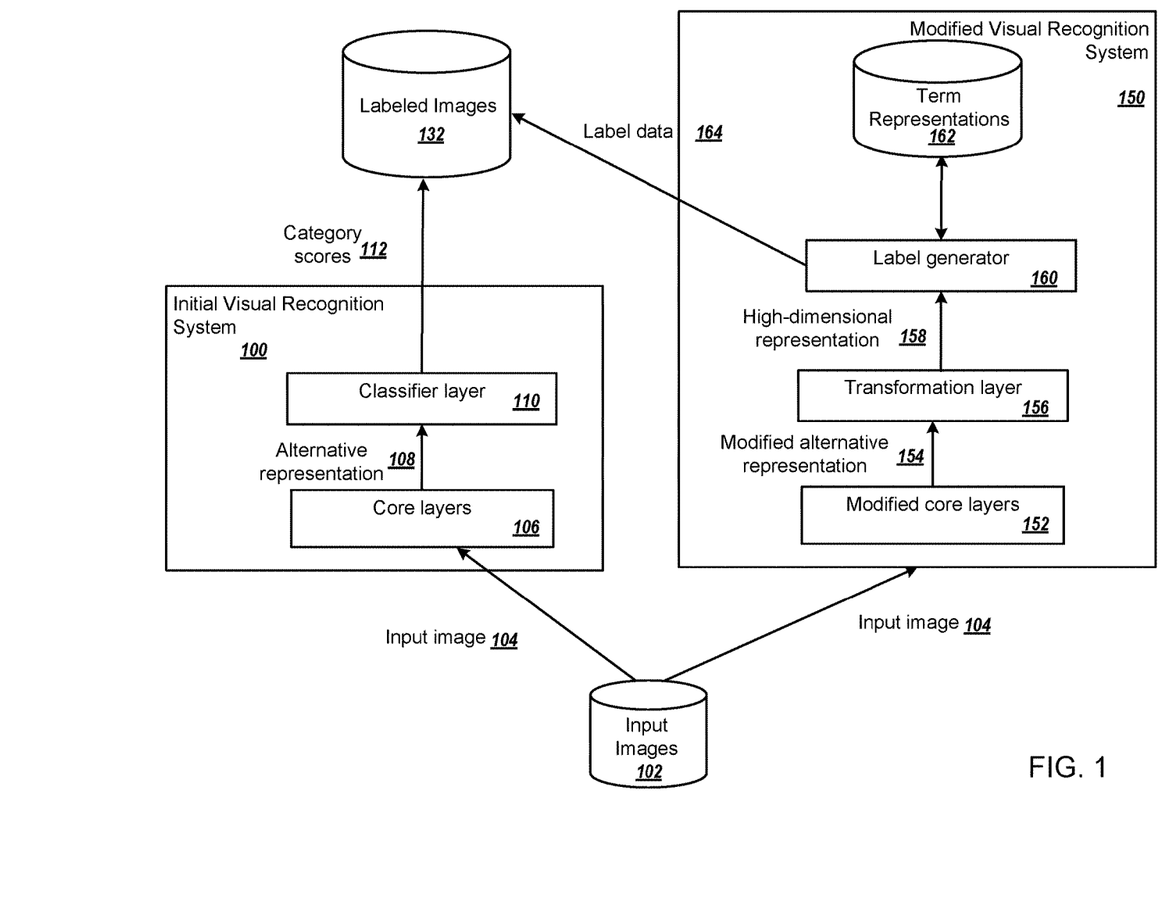
FIG. 1 shows an example initial visual recognition system and an example modified visual recognition system.

FIG. 1 shows an example initial visual recognition system 100 and an example modified visual recognition system 150. The initial visual recognition system 100 and the modified visual recognition system 150 are examples of systems implemented as computer programs on one or more computers in one or more locations, in which the systems, components, and techniques described below can be implemented.

The initial visual recognition system 100 receives input images, e.g., an input image 104 from an input image database 102, and, for each input image, generates a respective score for each object category of a pre-determined set of object categories. For example, the initial visual recognition system 100 can generate category scores 112 for the input image 104. The score for a given category represents a likelihood that the input image includes an image of an object in the category. For example, if one of the object categories is horses, the score for the horses category represents a likelihood that the input image contains an image of a horse. The object categories may be generic, e.g., horses, or specific, e.g., George Washington. As another example, the object categories may include a generic numbers category or specific categories for each of the digits zero through nine. Each of the object categories is associated with a respective label, e.g., "horses" for a horses category or "nine" for a category that includes images of the digit nine.

Once the scores for a given input image are generated, the initial visual recognition system 100 may store the input image in a labeled image database 132. For example, the system may store the image in association with the label for the category that has the highest category score or in association with multiple labels, e.g., with a label for each category that has a category score over a threshold value. In some implementations, instead of or in addition to storing the input image in the labeled image database 132, the initial visual recognition system 100 may associate the label or labels with the input image and provide the labeled image for use for some immediate purpose.

The initial image classification system 100 includes one or more core layers 106 and a classifier layer 110. An initial layer of the core layers 106 receives the input image, e.g., the input image 104, and the core layers 106 collectively process the image to generate an alternative representation of the input, e.g., the alternative representation 108 of the input image 104. Each of the core layers 106 receives an input and processes the input to generate an output in accordance with a respective set of parameters.

The classifier layer 110 receives the alternative representation from the core layers 106 and generates the category scores for the input image from the alternative representation, e.g., category scores 112 from the alternative representation 108, in accordance with a set of parameters. For example, the classifier layer 110 may be a softmax classifier, i.e., a multinomial logistic regression classifier. An example initial image classification system that includes multiple core layers and a softmax classifier layer is described in *Imagenet classification with deep convolutional neural networks*, Alex Krizhevsky, Ilya Sutskever, and Geoffrey E. Hinton, NIPS, pages 1106-1114, 2012.

In some instances, it may be advantageous to modify the initial visual recognition system 100 to, instead of generating respective category scores for a set of object categories for each input image, generate a high-dimensional representation of the label for an object category that the system determines an object pictured in the input image belongs to.

The modified visual recognition system 150 is an example of a system that generates numeric representations for input images. The numeric representations are representations in a high-dimensional space, e.g., high-dimensional representations 158 for the input image 104. For example, the numeric representations may be one-thousand dimensional vectors of floating point values.

The modified visual recognition system 150 includes a label generator 160 that, once the high-dimensional representation for an input image is generated, determines the label for the input image using data stored in a term representations data store 162. The label generator 160 then provides the label as label data, e.g., as label data 164 for the input 104, to be associated with the input and stored in the labeled images database 132 or used for some other immediate purpose.

The term representations data store 162 stores data that associates each term, i.e., each word or phrase, in a predetermined vocabulary of terms with a respective numeric representation for the term in the high-dimensional space, i.e., data that gives each term a location in the high-dimensional space. Determining a label from a high-dimensional representation using the associations is described below with reference to FIG. 2.

The modified visual recognition system 150 includes modified core layers 152 that receive an input image and collectively generate a modified alternative representation of the input image, e.g., modified alternative representation 154 for the input image 104. The modified core layers 152 are the same as the core layers 106, but, once the modified visual recognition system 150 is trained, have different parameter values from those of the core layers 106. Training a modified visual recognition system to adjust the parameters of the modified core layers 152 is described in more detail below with reference to FIG. 3.

Because the modified alternative representation 154 is generated by the core layers in accordance with different parameter values from those of the core layers 106, the modified alternative representation 154 of the input image 104 will generally differ from the alternative representation 108 of the same input image 104 produced by the initial visual recognition system 100.

The modified visual recognition system 150 also includes a transformation layer 156 that receives the modified alternative representation from the modified core layers 152 and generates a high-dimensional representation for the input image, e.g., the high-dimensional representation 158 for the input image 104. The transformation layer 156 transforms the modified alternative representation into the high-dimensional space in accordance with a set of parameters in order to generate the high-dimensional representation of the input image. For example, the transformation layer 156 may transform an alternative representation having four thousand or more dimensions into a one-thousand dimensional representation.

Figure 2:
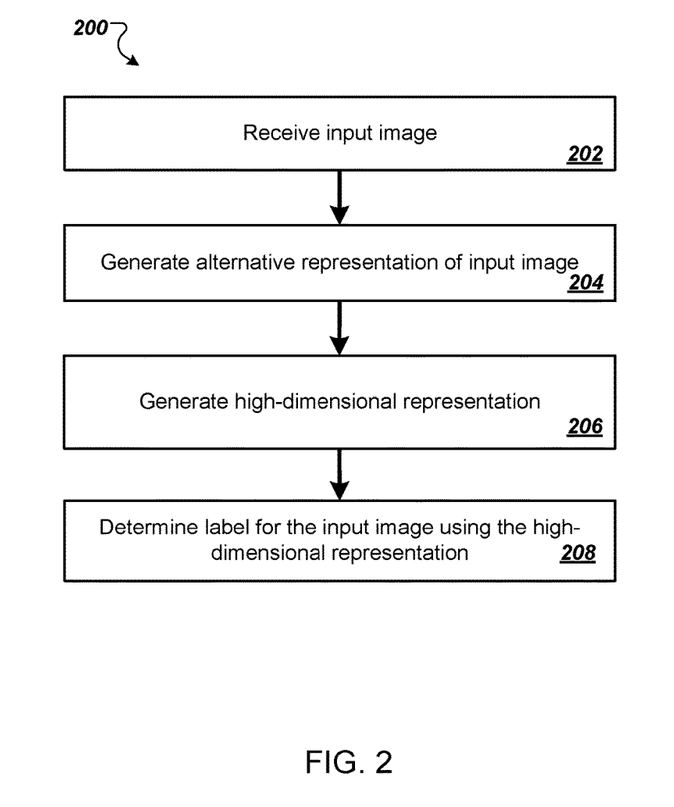
FIG. 2 is a flow diagram of an example process for generating a label for an input image.

FIG. 2 is a flow diagram of an example process 200 for generating a label for an input image. For convenience, the process 200 will be described as being performed by a system of one or more computers located in one or more locations. For example, a modified visual recognition system, e.g., the modified visual recognition system 150 of FIG. 1, appropriately programmed, can perform the process 200.

The system receives an input image (step 202) and generates an alternative representation of the input image (step 204).

The system generates the alternative representation of the input image by processing the input image using a set of modified core layers, e.g., the modified core layers 152 of FIG. 1, that receive the input image and collectively process the input image to generate an alternative representation of the image. For example, the modified core layers may include one or more of convolutional filtering layers, local contrast normalization layers, max-pooling layers, or fully-connected neural network layers. An example visual recognition system that includes each of these is described in *Imagenet classification with deep convolutional neural networks*, Alex Krizhevsky, Ilya Sutskever, and Geoffrey E. Hinton, NIPS, pages 1106-1114, 2012.

The system generates a high-dimensional representation for the input image by processing the alternative representation using a transformation layer (step 206). The transformation layer transforms the alternative representation into the high-dimensional space in accordance with a set of parameters.

The system determines a label for the input image using the high-dimensional representation (step 208). In order to determine the label, the system accesses data stored in a term representations data store, e.g., the term representations data store 162 of FIG. 1. The term representations data store stores data that associates each term of a pre-determined vocabulary of terms with a high-dimensional representation for the term, i.e., gives each term a location in the high-dimensional space. The associations are generated so that locations of terms in the high-dimensional space reflect semantic and syntactic similarities between the terms. Generating associations that have these characteristics is described below with reference to FIG. 3.

In some cases, each term that has an associated representation in the term representations data store may be a potential label for an input image. In these cases, the system can determine the label for the input image by determining the representation in the data store that is closest to the representation for the input. For example, the system can determine the closest representation by identifying the representation that has the largest cosine similarity value with the representation for the input image. The system can then select the term that is associated with the closest representation as the label for the input image. Optionally, the system can select multiple terms as labels for the input and order the terms by relevance. That is, the system can determine that the term having the representation that is closest to the representation for the input image is the most relevant label for the input image, the term that has the representation that is second closest to the representation for the input is the second most relevant label for the input image, and so on.

In some other cases, the term representations data store may also include representations for terms that are not potential labels for the input image. In these cases, the system determines the closest representation that is associated with a potential label and selects the potential label as the label for the input image.

In yet other cases, the system may determine the closest representation that is associated with a term that has at least a specified level of generality and select the term as the label for the input image. In some implementations, the system determines whether a particular term has at least the specified level of generality by determining whether the term is included in a pre-determined set of terms from the vocabulary of terms, i.e., a whitelist of terms provided by a user or system administrator. In other implementations, the system determines whether a particular term has at least the specified level of generality from the frequency with which the term appears in a text corpus. That is, the specified level of generality may be associated with a threshold frequency of occurrence, and the system can determine that any term that has a frequency of occurrence that exceeds the threshold frequency has at least the specified level of generality. The text corpus may include, for example, one or more of: Internet documents, search queries submitted to an Internet search engine, books, encyclopedia articles, and so on.

The process 200 can be performed to generate a label for an image for which the desired label is not known, i.e., an input image that has not yet been classified as including images of any objects. The process 200 can also be performed to classify an input image from a set of training data, i.e., a set of input images for which the output that should be generated by the system is known, in order to train the system, i.e., to determine trained values for the parameters of the modified core layers and the transformation layer.

For example, the process can be performed repeatedly on inputs selected from a set of training data as part of a training technique that determines trained values for the parameters of the modified core layers and the transformation layer by minimizing a loss function. The loss function for a given training image may depend in part on the distance, e.g., cosine similarity, between the known representation for the training image and the representation for the training image generated by the system. For example, the loss function for a given training image can be expressed as:

$$\text{loss(image, label)} = \sum_{j \neq \text{label}} \max[0, \text{margin} - \vec{t}_{label} M \vec{v}(\text{image}) + \vec{t}_j M \vec{v}(\text{image})],$$

where label is the known category label for the training image, $\vec{v}(\text{image})$ is the output of the last layer of the modified core layers for the training image, M is a matrix of parameter values of the transformation layer, $\vec{t}_{label}$ is the representation of the known label for the training image in the high-dimensional space, $\vec{t}_j$ is the high-dimensional representation of a given term j in the pre-determined vocabulary of terms, and margin is a constant value, e.g., 0, 0.1, 0.5, or 1. In some implementations, when the pre-determined vocabulary of terms includes terms that are not potential labels for input images, the system can constrain the training process so that the terms j include only terms in the vocabulary that are potential labels for input images. Additionally, in some implementations, the terms j may be a randomly or pseudo-randomly selected subset of the other potential labels that are associated with representations in the term representations data store.

Thus, by minimizing the loss function, the system may be trained to produce, for each training image in the set of training images, a higher cosine similarity between the generated high-dimensional representation for the training image and the high-dimensional representation of the correct label for the training image than between the respective cosine similarities between the generated high-dimensional representation for the training image and the high-dimensional representations of other possible labels.

Figure 3:
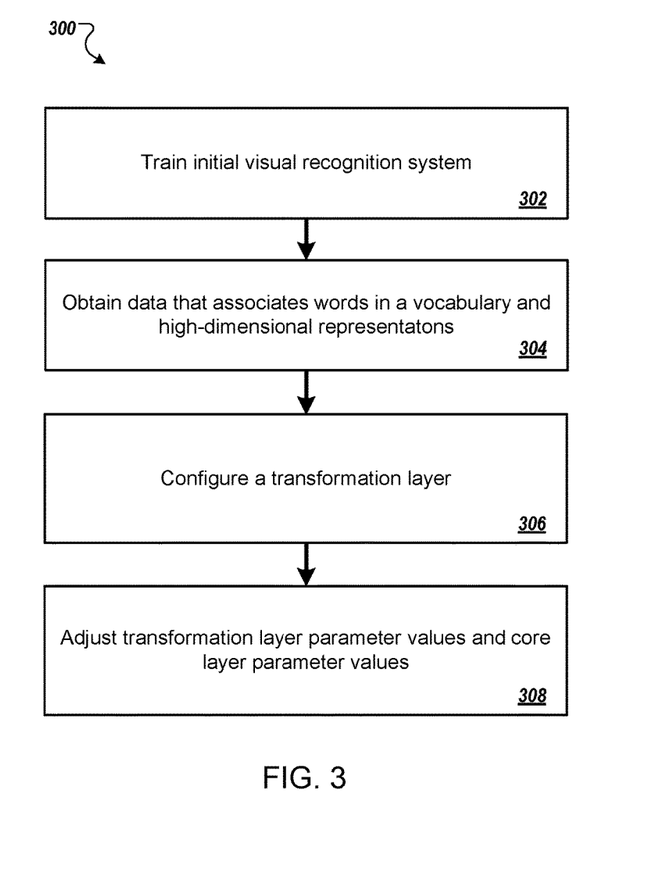
FIG. 3 is a flow diagram of an example process for training a modified visual recognition system.

FIG. 3 is a flow diagram of an example process 300 for training a modified visual recognition system. For convenience, the process 300 will be described as being performed by a system of one or more computers located in one or more locations. For example, a modified visual recognition system, e.g., the modified visual recognition system 150 of FIG. 1, appropriately programmed, can perform the process 300.

The system trains an initial visual recognition system, e.g., the initial visual recognition system 100 of FIG. 1 (step 302), to produce pre-trained values of the components of the visual recognition system, i.e., a set of core layers and a classifier layer, e.g., the core layers 106 and the classifier layer 110 of FIG. 1. The system may train the initial visual recognition system using conventional machine learning techniques, e.g., using stochastic gradient descent.

The system obtains data that associates each term in a vocabulary of terms with a respective high-dimensional representation of the term (step 304), i.e., gives each term a location in the high-dimensional space. The associations are generated so that the relative locations of terms reflect semantic and syntactic similarities between the terms. That is, the relative locations of terms in the high-dimensional space reflect syntactic similarities between the terms, e.g., showing that, by virtue of their relative location in the space, words that are similar to the word "he" may include the words "they," "me," "you," and so on, and semantic similarities, e.g., showing that, by virtue of their relative locations in the space the word "queen" is similar to the words "king" and "prince." Furthermore, relative locations in the space may show that the word "king" is similar to the word "queen" in the same sense as the word "prince" is similar to the word "princess," and, in addition, that the word "king" is similar to the word "prince" as the word "queen" is similar to the word "princess."

Additionally, operations can be performed on the locations to identify words that have a desired relationship to other words. In particular, vector subtraction and vector addition operations performed on the locations can be used to determine relationships between words. For example, in order to identify a word X that has a similar relationship to a word A as a word B has to a word C, the following operation may be performed on the vectors representing words A, B, and C: vector(B)−vector(C)+vector(A). For example, the operation vector("Man")−vector("Woman")+vector("Queen") may result in a vector that is close to the vector representation of the word "King."

Associations of terms to high-dimensional vector representations having these characteristics can be generated by training a machine learning system configured to process each term in the vocabulary of terms to obtain a respective numeric representation of each term in the vocabulary in the high-dimensional space and to associate each term in the vocabulary with the respective numeric representation of the term in the high-dimensional space. Example techniques for training such a system and generating the associations are described in Tomas Mikolov, Kai Chen, Greg S. Corrado, and Jeffrey Dean, *Efficient estimation of word representations in vector space*, International Conference on Learning Representations (ICLR), Scottsdale, Ariz., USA, 2013.

The system configures a transformation layer to receive an input, i.e., an alternative representation generated by the core layers of the initial visual recognition system, and transform the input into the high-dimensional space in accordance with a set of parameters (step 306). The system also assigns initial values to the parameters of the transformation layer, i.e., using a machine learning parameter initialization procedure that is appropriate for the transformation layer. For example, the initialization procedure may assign a small random value to each parameter of the transformation layer.

The system adjusts the initial values of the parameters of the transformation layer and the pre-trained values of the parameters of the core layers to determine trained values for each of the parameters of the core layers and the parameters of the transformation layer (step 308). The system generates the trained values by performing multiple iterations of a machine learning model training technique in order to minimize a loss function, e.g., the loss function described above. For example, the system may perform multiple iterations of a distributed-computation asynchronous stochastic gradient descent training procedure, e.g., using the framework described in Jeffrey Dean, Greg S. Corrado, Rajat Monga, Kai Chen, Matthieu Devin, Quoc V. Le, Mark Z. Mao, MarcAurelio Ranzato, Andrew Senior, Paul Tucker, Ke Yang, and Andrew Y. Ng, *Large scale distributed deep networks*, Conference on Neural Information Processing Systems (NIPS), 2012. The system can perform the training technique on the same training data that was used to train the initial visual recognition system or on different training data.

During the training, the system may first train the parameters of the transformation layer while holding the parameters of the core layers fixed. In later stages of the training, the system can back-propagate the derivative of the loss function to the core layers to adjust the core layer parameter values. Optionally, the system can back-propagate the derivative of the loss function to the term association data, i.e., allowing the system to modify the high-dimensional representations associated with one or more of the terms in the vocabulary as part of the training procedure.

The above description has described the modified core layers having different parameter values from those of the initial core layers. In some implementations, however, e.g., because training the modified core layers did not result in a change in parameter values of the modified core layers or because no further training was performed on the modified core layers after the initial core layers were trained, the parameters values of the modified core layers may be the same as the parameter values of the initial core layers.

Additionally, while the above description describes using the modified visual recognition system to associate labels with input images, the modified visual recognition system may also be used to map an input image to one of a set of known images. That is, once the modified visual recognition system has determined the high-dimensional representation for an input image, the system can compare the representation for the input image to representations for other images previously processed by the system. The system can then map the input image to the other image having a representation that is closest to the representation for the input image. Similarly, the modified visual recognition system may also be used to map terms in the vocabulary of terms to images. That is, the system may compare the high-dimensional representation of a term to representations for images previously processed by the system and map the term to the image having a representation that is closest to the representation of the term.

The above description has described cosine similarity as the distance measure to be used by the system to compare distances between high-dimensional representations, e.g., to determine which high-dimensional representation is closest to another high-dimensional representation or to determine distances between high-dimensional representations during training. However, other distance measures can be used in place of cosine similarity, e.g., Euclidian distance, Hamming distance, and so on. Similarly, the system can also regularize the representations and then compute the distance between the regularized representations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   obtaining data that associates each term in a vocabulary of terms with a respective high-dimensional representation of the term, wherein the high-dimensional representation of the term is a numeric representation of the term in a high-dimensional space, and wherein the vocabulary of terms comprises a plurality of object category labels; and
   training a modified visual recognition system on a plurality of training images, wherein the modified visual recognition system includes a neural network having multiple layers, wherein each of the plurality of training images is associated with a respective known category label from the plurality of object category labels, wherein the modified visual recognition system is configured to, for each of the training images, receive the training image and to output a high-dimensional representation in the high-dimensional space for the training image, and wherein the training comprises:
   performing multiple iterations of a training procedure to minimize a loss function to determine trained values of parameters of the neural network, wherein the loss function satisfies, for each of the training images:

$$\text{loss}(\text{image},\text{label}) = \Sigma_{j \neq \text{label}} \max[0, \text{margin} - t_{\text{label}} \cdot \text{representation} + t_j \cdot \text{representation}],$$ wherein:

image is the training image
   label is a known category label for the training image,
   representation is a current iteration high-dimensional representation for the training image in a current iteration of the training procedure,
   $t_{\text{label}}$ is a high-dimensional representation of the known label,
   $t_j$ is a high-dimensional representation of an object category label j in the vocabulary of terms other than the known label, and
   margin is a constant value.

2. The method of claim 1, wherein the modified visual recognition system is configured to, for each of the training images, receive the training image and to select an object category label having a high-dimensional representation that is closest to the high-dimensional representation for the training image as an object category label for the training image,
   wherein the object category label for the training image is a category label for an object category that the modified visual recognition system determines an object pictured in the training image belongs to,
   wherein the neural network of the modified visual recognition system comprises two or more core layers and a transformation layer,
   wherein the two or more core layers are configured to receive the training image and generate an alternative representation of the training image, and
   wherein the transformation layer is configured to receive the alternative representation of the training image from the two or more core layers and generate the high-dimensional representation for the training image.

3. The method of claim 2, further comprising:
   training an initial visual recognition system on the plurality of training images to determine pre-trained values of parameters of the two or more core layers, wherein the initial visual recognition system includes a neural network having multiple layers,
   wherein the initial visual recognition system is configured to, for each of the training images, receive the training image and predict a respective score for each of a plurality of object categories,
   wherein the respective score for each of the plurality of object categories represents a predicted likelihood that the training image contains an image of an object from the object category,
   wherein the initial visual recognition system comprises the two or more core layers, which the initial visual recognition system has in common with the modified visual recognition system, and a classifier layer,
   wherein the classifier layer is configured to receive the alternative representation of the training image and generate the respective scores for the training image, and
   wherein the initial visual recognition system does not include the transformation layer of the modified visual recognition system; and
   training the modified visual recognition system after training the initial visual recognition system, wherein training the modified visual recognition system comprises further training the two or more core layers.

4. The method of claim 3, wherein training the modified visual recognition system comprises generating trained values of parameters of the two or more core layers and of parameters of the transformation layer from the pre-trained values of the parameters of the two or more core layers and initial values of the parameters of the transformation layer.

5. The method of claim 2, wherein selecting an object category label having a high-dimensional representation that is closest to the high-dimensional representation for the training image comprises selecting an object category label that is associated with a high-dimensional representation that has a largest cosine similarity value with the high-dimensional representation for the training image.

6. The method of claim 1, wherein training the modified visual recognition system comprises training the modified visual recognition system to produce, for each of the training images, a higher cosine similarity between the high-dimensional representation for the training image and the high-dimensional representation of a label for a corresponding known object category for the training image than between the predicted high-dimensional representation for the training image and representations of other terms in the vocabulary.

7. The method of claim 1, wherein obtaining the data that associates each term in a vocabulary of terms with a respective high-dimensional representation of the term comprises:
   training a machine learning system configured to process each term in the vocabulary of terms to obtain the respective high-dimensional representation of the term in the vocabulary and to associate each term in the vocabulary with the respective high-dimensional representation of the term.

8. A system comprising one or more computers and one or more storage devices storing instructions that, when executed by the one or more computers, cause the one or more computers to perform operations comprising:
   obtaining data that associates each term in a vocabulary of terms with a respective high-dimensional representation of the term, wherein the high-dimensional representation of the term is a numeric representation of the term in a high-dimensional space, and wherein the vocabulary of terms comprises a plurality of object category labels; and training a modified visual recognition system on a plurality of training images, wherein the modified visual recognition system includes a neural network having multiple layers, wherein each of the plurality of training images is associated with a respective known category label from the plurality of object category labels, wherein the modified visual recognition system is configured to, for each of the training images, receive the training image and to output a high-dimensional representation in the high-dimensional space for the training image, and wherein the training comprises:

performing multiple iterations of a training procedure to minimize a loss function to determine trained values of parameters of the neural network, wherein the loss function satisfies, for each of the training images:

$$\text{loss}(\text{image},\text{label})=\Sigma_{j\neq label}\max[0,\text{margin}-t_{label}\text{representation}+t_j\text{representation}], \text{ wherein:}$$

image is the training image label is a known category label for the training image, representation is a current iteration high-dimensional representation for the training image in a current iteration of the training procedure, $t_{label}$ is a high-dimensional representation of the known label, $t_j$ is a high-dimensional representation of an object category label j in the vocabulary of terms other than the known label, and margin is a constant value.

9. The system of claim 8, wherein the modified visual recognition system is configured to, for each of the training images, receive the training image and to select an object category label having a high-dimensional representation that is closest to the high-dimensional representation for the training image as an object category label for the training image, wherein the object category label for the training image is a category label for an object category that the modified visual recognition system determines an object pictured in the training image belongs to, wherein the neural network of the modified visual recognition system comprises two or more core layers and a transformation layer, wherein the two or more core layers are configured to receive the training image and generate an alternative representation of the training image, and wherein the transformation layer is configured to receive the alternative representation of the training image from the two or more core layers and generate the high-dimensional representation for the training image.

10. The system of claim 9, the operations further comprising:

training an initial visual recognition system on the plurality of training images to determine pre-trained values of parameters of the two or more core layers, wherein the initial visual recognition system includes a neural network having multiple layers, wherein the initial visual recognition system is configured to, for each of the training images, receive the training image and predict a respective score for each of a plurality of object categories, wherein the respective score for each of the plurality of object categories represents a predicted likelihood that the training image contains an image of an object from the object category, wherein the initial visual recognition system comprises the two or more core layers, which the initial visual recognition system has in common with the modified visual recognition system, and a classifier layer, wherein the classifier layer is configured to receive the alternative representation of the training image and generate the respective scores for the training image, and wherein the initial visual recognition system does not include the transformation layer of the modified visual recognition system; and training the modified visual recognition system after the training the initial visual recognition system, wherein training the modified recognition system comprises further training the two or more core layers.

11. The system of claim 10, wherein training the modified visual recognition system comprises generating trained values of parameters of the two or more core layers and of parameters of the transformation layer from the pre-trained values of the parameters of the two or more core layers and initial values of the parameters of the transformation layer.

12. The system of claim 9, wherein selecting an object category label having a high-dimensional representation that is closest to the high-dimensional representation for the training image comprises selecting an object category label that is associated with a high-dimensional representation that has a largest cosine similarity value with the high-dimensional representation for the training image.

13. The system of claim 8, wherein training the modified visual recognition system comprises training the modified visual recognition system to produce, for each of the training images, a higher cosine similarity between the high-dimensional representation for the training image and the high-dimensional representation of a label for a corresponding known object category for the training image than between the predicted high-dimensional representation for the training image and representations of other terms in the vocabulary.

14. The system of claim 8, wherein obtaining the data that associates each term in a vocabulary of terms with a respective high-dimensional representation of the term comprises:

training a machine learning system configured to process each term in the vocabulary of terms to obtain the respective high-dimensional representation of the term in the vocabulary and to associate each term in the vocabulary with the respective high-dimensional representation of the term.

15. One or more non-transitory computer storage media storing instructions that when executed by one or more computers cause the one or more computers to perform operations comprising:

obtaining data that associates each term in a vocabulary of terms with a respective high-dimensional representation of the term, wherein the high-dimensional representation of the term is a numeric representation of the term in a high-dimensional space, and wherein the vocabulary of terms comprises a plurality of object category labels; and training a modified visual recognition system on a plurality of training images, wherein the modified visual recognition system includes a neural network having multiple layers, wherein each of the plurality of training images is associated with a respective known category label from the plurality of object category labels, wherein the modified visual recognition system is configured to, for each of the training images, receive the training image and to output a high-dimensional representation in the high-dimensional space for the training image, and wherein the training comprises:

performing multiple iterations of a training procedure to minimize a loss function to determine trained values of parameters of the neural network, wherein the loss function satisfies, for each of the training images:

$$\text{loss(image,label)} = \Sigma_{j \neq label} \max[0, \text{margin} - t_{label}\text{-representation} + t_j\text{-representation}], \text{ wherein:}$$

image is the training image
label is a known category label for the training image,
representation is a current iteration high-dimensional representation for the training image in a current iteration of the training procedure,
$t_{label}$ is a high-dimensional representation of the known label,
$t_j$ is a high-dimensional representation of an object category label j in the vocabulary of terms other than the known label, and margin is a constant value.

16. The computer storage media of claim 15, wherein training the modified visual recognition system comprises training the modified visual recognition system to produce, for each of the training images, a higher cosine similarity between the high-dimensional representation for the training image and the high-dimensional representation of a label for a corresponding known object category for the training image than between the predicted high-dimensional representation for the training image and representations of other terms in the vocabulary.

17. The computer storage media of claim 15, wherein obtaining the data that associates each term in a vocabulary of terms with a respective high-dimensional representation of the term comprises:

training a machine learning system configured to process each term in the vocabulary of terms to obtain the respective high-dimensional representation of the term in the vocabulary and to associate each term in the vocabulary with the respective high-dimensional representation of the term.

* * * * *